US011703359B2

(12) United States Patent
Smith et al.

(10) Patent No.: US 11,703,359 B2
(45) Date of Patent: Jul. 18, 2023

(54) INDUCTIVE POSITION SENSING APPARATUS INCLUDING A SCREENING LAYER AND METHOD FOR THE SAME

(71) Applicant: Kyocera AVX Components (Werne) GmbH, Werne (DE)

(72) Inventors: Paul Smith, Cambridge (GB); Robert Wood, Norwich (GB); John Simm, Royston (GB); Timothy Biggs, Cambourne (GB)

(73) Assignee: Kyocera AVX Components (Werne) GmbH, Werne (DE)

( * ) Notice: Subject to any disclaimer, the term of this patent is extended or adjusted under 35 U.S.C. 154(b) by 113 days.

(21) Appl. No.: 16/868,587

(22) Filed: May 7, 2020

(65) Prior Publication Data

US 2020/0363238 A1 Nov. 19, 2020

Related U.S. Application Data

(60) Provisional application No. 62/847,507, filed on May 14, 2019.

(51) Int. Cl.
*G01D 5/20* (2006.01)

(52) U.S. Cl.
CPC ................... *G01D 5/2013* (2013.01)

(58) Field of Classification Search
CPC ...... G01D 5/202; G01D 5/204; G01D 5/2046; G01D 5/2053; G01D 5/2216; G01D 5/2225; G01D 5/225; G01D 5/2258; G01D 5/2275; G01D 5/2013; G01D 5/20; F15B 15/2869; G01B 7/003; H05K 9/002
See application file for complete search history.

(56) References Cited

U.S. PATENT DOCUMENTS

| | | | | |
|---|---|---|---|---|
| 4,820,961 | A | * | 4/1989 | McMullin ............ G01D 5/2053 318/587 |
| 5,265,480 | A | * | 11/1993 | Tsuji ..................... G01L 3/104 73/862.325 |
| 6,011,389 | A | | 1/2000 | Masreliez et al. |
| 6,642,710 | B2 | | 11/2003 | Morrison et al. |
| 7,196,604 | B2 | | 3/2007 | Sills et al. |
| 7,298,137 | B2 | | 11/2007 | Howard et al. |
| 7,319,319 | B2 | | 1/2008 | Jones et al. |

(Continued)

FOREIGN PATENT DOCUMENTS

| WO | WO2008032008 | 3/2008 |
|---|---|---|
| WO | WO2015140080 | 9/2015 |

OTHER PUBLICATIONS

Chinese Office Action with English translation from Application No. CN 202010406616.4 dated Dec. 6, 2021. (32 pages).

*Primary Examiner* — Lee E Rodak
(74) *Attorney, Agent, or Firm* — Dority & Manning, P.A.

(57) ABSTRACT

An inductive position sensor may be configured to detect relative position between a first member and a second member. The inductive position sensor may include an inductive sensor element configured to be coupled to the first member and a screening layer formed over a screened portion of a member surface of the second member such that an exposed portion of the member surface is free of the screening layer. The screening layer may be configured to reduce an effect on induced signals in the inductive sensor element caused by the screened portion of the second member.

14 Claims, 6 Drawing Sheets

(56) References Cited

U.S. PATENT DOCUMENTS

| | | |
|---|---|---|
| 7,451,658 B2 | 11/2008 | Sills et al. |
| 7,868,609 B2 | 1/2011 | Zhitomirskiy |
| 2009/0184707 A1 | 7/2009 | Luetzow |
| 2011/0291780 A1* | 12/2011 | Takahashi ............ G01D 5/2451 335/284 |
| 2013/0043863 A1 | 2/2013 | Ausserlechner et al. |
| 2014/0327432 A1 | 11/2014 | Elliott et al. |
| 2017/0307411 A1* | 10/2017 | Elliott .................... G01D 5/204 |
| 2017/0307412 A1 | 10/2017 | Elliott et al. |
| 2019/0056244 A1 | 2/2019 | Elliott et al. |
| 2019/0056251 A1 | 2/2019 | Elliot et al. |
| 2019/0063954 A1 | 2/2019 | Elliott |
| 2020/0011394 A1* | 1/2020 | Nardemann ............. F16F 9/19 |

* cited by examiner

INDUCTIVE POSITION SENSING APPARATUS INCLUDING A SCREENING LAYER AND METHOD FOR THE SAME

PRIORITY CLAIM

The present application claims the benefit of priority of U.S. Provisional Application Ser. No. 62/847,507, titled "Inductive Position Sensing Apparatus Including a Screening Layer and Method for the Same," filed on May 14, 2019, which is incorporated herein by reference.

FIELD

The present disclosure relates generally to sensing relative position between two members, and more specifically to a system and method for inductively detecting a relative position between a first member and a second member using a screening layer.

BACKGROUND

Various forms of inductive position sensors are known for detecting the position of a first member relative to a second member. In some instances, one member can carry an inductive sensor element while the other member can carry a soft magnetic or conductive target. The inductive sensor element can be configured to detect relative position of the two members by detecting the position of the soft magnetic or conductive target relative to the inductive sensor element.

SUMMARY

Aspects and advantages of embodiments of the present disclosure will be set forth in part in the following description, or may be learned from the description, or may be learned through practice of the embodiments.

One example aspect of the present disclosure is directed to an inductive position sensor configured to detect relative position between a first member and a second member. The inductive position sensor may include an inductive sensor element configured to be coupled to the first member and a screening layer formed over a screened portion of a member surface of the second member such that an exposed portion of the member surface is free of the screening layer. The screening layer may be configured to reduce an effect on induced signals in the inductive sensor element caused by the screened portion of the second member.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
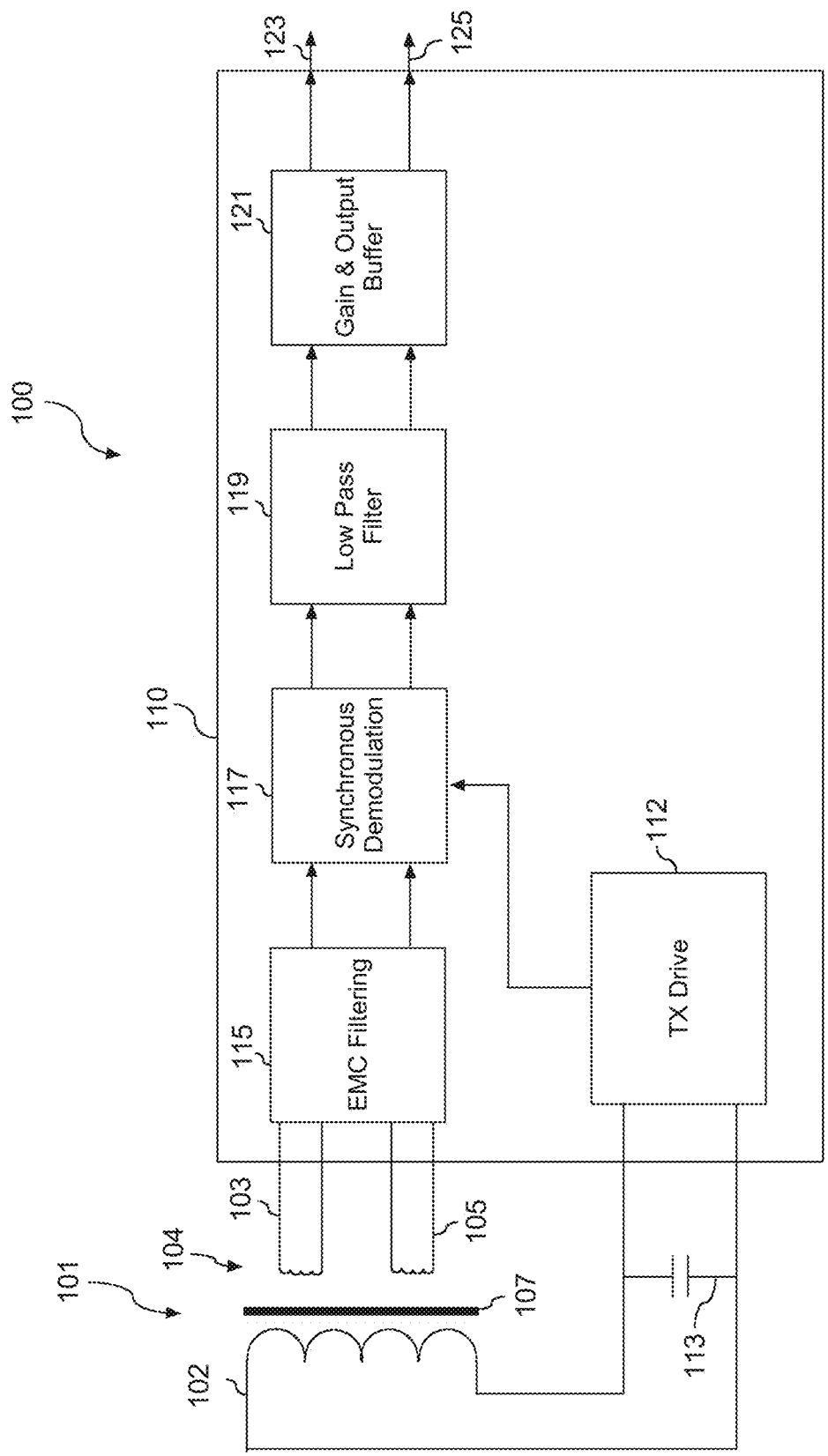
FIG. 1 depicts a schematic of select portions of an example inductive position sensor including processing circuitry according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to position sensors and more particularly, to inductive position sensors. A soft magnetic material, such as ferrite, may be used to form a "spot target" for the inductive sensor by "hiding" a portion of a surface of a conductive member from the inductive sensor. More specifically, properties of the ferrite material may be selected to approximately balance, on the one hand, interaction between the conductive member and the sensor element, and, on the other hand, interaction between the soft magnetic ferrite material and the sensor element. In other words, field enhancement from the ferrite and field reduction from the metal may become approximately equal and opposite such that the effect on the inductive sensor is essentially the same as an absence of material, (e.g., air or vacuum).

When approximately balanced, the conductive member underneath the ferrite material may have a negligible effect on the sensor element. Thus, the ferrite material may effectively hide portions of the conductive member that are covered by the ferrite material. A portion of the conductive member that is not covered by the ferrite material can then act as a spot target for the inductive position sensor.

A variety of "spot target" inductive position sensors may be used within the scope of the present disclosure. In general terms, inductive position sensors can be categorized as "spot target" or "integrating target" sensors. In each case, the sensor itself can be as long as the movement to be measured. The overlap of a moving part with the sensor can be measured by an integrating target sensor, or a position of a small target placed on the moving part can be measured by a spot target sensor.

Some spot target sensors work with a resonant target, a metal target, or a soft magnetic target, such as ferrite. Such targets typically locally modify the mutual inductance or self-inductance of one or more coils of the sensor in vicinity of the target. The coil(s) can be arranged on the sensor so that the position of the target and its effect on the sensor coil(s) can be established using interrogating electronics.

As one example of an integrating sensor, a solenoid which has a moving magnetic core can act as the target. The inductance of the solenoid can vary according to the overlap of the magnetic core with the sensor. Solenoids intrinsically sense the amount of overlap, instead of a location of the end (e.g., an end face) of the core.

Inductive systems measure an overlap by effectively integrating the impact of the long target along the length of the sensor. But the impact of a target on the sensor can depend on a number of distances associated with the sensor system, such a separation distance between the target and sensor.

Spot target systems can be made to compensate for changes caused by changes in the separation distance. One way to achieve such compensation is by comparing signals from different coils, overall signal strength might be affected but the relative relationship of signals from different coils in which the positional information is encoded is preserved when separation changes.

For an integrating target system, certain changes in separation to the target would have a similar effect. Overall signal strength may be changed, but positional information is generally preserved. The methods of comparing signals from different coils can be used. However, changes in separation that are un-even along the length of the overlap (for example those caused by a misalignment of a sensor axis of the sensor and a target axis of movement of the target) can cause both a change in overall signal strength and a change in the positional information encoded in the sensor signals/inductances/mutual inductances. The positional errors created by such "tilts" can be very significant. This is because positional information originating from a point along the target overlap where the "signal" is stronger due to a tilt has a greater weight in the sensed position.

For this reason, practical integrating target systems tend to use circular symmetry. As one example, a target might include a rod, and a sensor may include a wound coil surrounding the target. As another example, planar coils on a printed circuit board might be enveloped by a tubular target. In such configurations, the overall effect of geometric changes between the target and sensor are minimized by the circular symmetry of the target and sensor.

However, such symmetry may not always be cost effective or feasible, for example due to space constraints. This drawback for integrating sensors can be a relative advantage for spot target sensors, which are typically insensitive to a wider range of geometric changes between the target and sensor. A further advantage of spot target sensors over integrating ones is that they are typically shorter for a given measurement length.

The geometry of some applications can be less than ideal for spot target sensors. Inductive sensors are naturally sensitive to conducting and soft magnetic objects. Ideally, the only conductive or magnetic object within a sensor's field of influence should be the target. This is not always possible, however.

As one example, consider the problem of measuring a hydraulic cylinder or damper with an inductive sensor. A long PCB based inductive sensor can be placed near or inside a part of the damper, a relatively compact and cost effective solution. Such a configuration would naturally form an integrating target, measuring the overlap of sensor and target. However, as previously discussed such configuration has significant measurement accuracy errors when the 'loose' geometric tolerances typical of this application are included; furthermore the integrating configuration typically requires a longer sensor. To transform the geometry into a spot target sensor (providing all of the advantages spot targets) a target could be placed onto the damper such that it is positioned closer to the sensor coil(s) than the overlapping body. But unless the sensor and target are packaged at a large distance from the overlapping damper body, the inductive sensor would pick up two "signals." One signal would originate from the spot target, and another signal would originate from the damper body, which would behave as an integrating target. This second signal would disrupt the measurement and introduce increased sensitivity to geometric tolerances As indicated above, aspects of the present disclosure are directed to using a screening "cloaking" material or structure to "hide" objects from the inductive sensor. In the damper application, a portion at the top of the damper body can be left exposed and act as a spot target. Such a configuration would confer advantages of spot targets, including maintaining positional accuracy over changes in the spacing distance. The damper body further down from the top portion would be coved in the ferrite cloaking material, which would have little or no influence on the inductive sensor. To achieve this affect, properties of the screening layer may be selected such that the screening layer in combination with the underlying conductive metal ideally neither reduces inductance and mutual inductance as a conductor typically would do, nor enhances inductance or mutual inductance as a magnetic material, such as ferrite, might normally do.

A screening structure can be formed on top of a conducting cylinder which, at a certain separation, successfully masks or screens the presence of the conducting cylinder to the inductive sensor. For example, ferrite and conducting metal have nearly equal and opposite effects on the sensor. The way ferrite and conducting metal influence the sensor as a function of distance is slightly different, which can make balancing their influences over a range of separations difficult. In some embodiments, the screening "cloaking" layer can also be used to hide or cloak other interfering objects from and inductive sensor, which can be useful for when it is impractical to shield the sensor itself.

Aspects of the present disclosure can be used to form or "mark" a target area on a previously "featureless" shaft. In other words, instead of building up a feature to act a target, a target can be formed by "cloaking" other parts of the shaft. The cloaking structure can be formed as a ferrite sticker or paint applied to a surface of the object.

According to example aspects of the present disclosure, an inductive position sensor may be configured to detect a relative position between a first member and a second member. The inductive position sensor may include transmit windings and receive windings that are configured to detect the location of conductive or soft magnetic objects based on electromagnetic interaction between the windings and the conductive or soft magnetic objects. The windings may be coupled to one of the members (e.g., a first member). As used herein, a first object that is "coupled to" a second object may refer to the first object being directly "disposed on" and/or otherwise attached to the second object or another structure or object that is attached to the second object such that relative movement between the first object and second object is minimized.

A screening layer may be disposed over a portion of another member (e.g., a second member) to "mask," "cloak," or "screen" part of the second member such that an un-screened or exposed portion can be used as a marker or target for the sensor (e.g., as a "spot target"). More specifically, a relative position of the exposed portion of the second member can be detected based on electromagnetic interaction between the windings and the exposed portion of the second member, which can be formed of a conductive material.

The screening layer may include a high permeability material, such as ferrite, mu metal, or other similar soft magnetic material. The screening layer may be formed over and/or may include a metal or other conductive material. For example, the screening layer may include a layer of high permeability material over a layer of conductive material. For instance, the screening layer may include a layer of ferrite formed over a layer of copper (e.g., copper "tape").

The high permeability material of the screening layer may be continuous or patterned. Such patterning could, for example, include local variations in thickness. For example, the screening layer can be patterned (e.g. have portions of "zero thickness"), in the form of stripes, squares, geometric, or other repeating patterns such that at least a portion of the layer of conductive material is exposed. Such patterns may provide greater control of the screening effect of the screening layer than available with a sheet of the high permeability material that has a uniform thickness.

Additionally, in some embodiments a conductive layer of material may be applied between the screening layer and the member to which the screening layer is applied. The conductive layer of material may also extend over some or all of the "exposed portion" of the member. This may facilitate greater control of the precise properties (e.g., thickness, conductivity, etc.) of the conductive material beneath the screening layer and/or covering the "exposed portion" of the member.

In yet further embodiments, a target ferrite layer can be formed over some or all of the "exposed portion," for example to act as a target for the sensor. Unlike the screening layer, which can be configured to mask the presence of conductive material (e.g., the member on which the screening layer is formed or a conductive layer formed over the member) as described herein, the target ferrite layer can be configured to interact with sensor such that the sensor can be used to detect the relative position of the target ferrite layer with respect to the sensor. Thus, the "exposed portion" of the member may refer to any portion of the member that is not covered by the screening layer.

Ferrite and conductive materials can produce different (e.g., approximately equal and/or opposite) effects in the inductive sensor element. More specifically, one or more properties of the screening layer may be selected to reduce or minimize electromagnetic interaction between the inductive sensor element and the screened portion of the second member. For example, magnetic permeability, electrical conductivity, a thickness, patterns within the screening material (e.g., ferrite) or the like can be selected to reduce (e.g., minimize) the effect on the inductive sensor element caused by the screened portion of the second member.

The screening layer may be applied in a variety of suitable manners within the scope of this disclosure. For example, the screening layer may be applied as a liquid, (e.g., as a "paint"), which subsequently dries to form the screening layer. As another example, a pre-formed sheet may be affixed or adhered to the surface of the member (e.g., as a "sticker").

Additionally, the exposed portion of the second member and the inductive sensor element may be spaced apart by a spacing distance. This spacing distance may be selected to reduce or minimize the electromagnetic interaction between the inductive sensor element and the screened portion of the second member. Thus, in some embodiments, a combination of the spacing distance and properties of the screening layer may be selectively controlled to minimize the electromagnetic interaction between the inductive sensor element and the screened portion of the second member such that the sensor can detect the relative position of the exposed portion of the second member to detect the relative position between the first and second members.

Employing a screening layer as disclosed herein may permit the relative position between two members to be detected without using a raised target. As such, aspects of the present disclosure may reduce manufacturing costs associated with producing the sensor and/or target. Additionally, the resulting sensor may be more compact than prior art sensors and/or produce less magnetic interference with nearby components or sensors that are sensitive to magnetic and/or electric fields. In some implementations, an existing integrating-type system can be transformed into a spot system, for example by retrofitting a screening layer according to aspects of the present disclosure.

The systems and methods disclosed herein may also provide advantages over "integrating" systems, which measure an overlapping distance between an elongated target (e.g., metal body) and inductive sensor. Such systems can be sensitive to relative misalignment between an axis of the inductive sensor and an axis of the target (e.g., "tilt"). Such systems generally employ circularly symmetric winding configurations that wrap around the member to reduce these effects. However, such symmetrical configurations are not always cost effective or feasible (e.g., due to space constraints). The presently disclosed systems and methods, in contrast, are generally less sensitive to relative misalignment and/or unintended movement between the inductive sensor element and exposed portion of the second member. Additionally, the presently disclosed systems can be successfully implemented without such a costly symmetrical configuration.

In some embodiments, the inductive position sensor may be configured to detect relative position between a first member and a second member. The inductive position sensor may include an inductive sensor element configured to be coupled to the first member and a screening layer formed over a screened portion of a member surface of the second member such that an exposed portion of the member surface is free of the screening layer. The screening layer may be configured to reduce an effect on induced signals in the inductive sensor element caused by the screened portion of the second member.

In some embodiments, the inductive position sensor may include processing circuitry configured to provide one or more signals indicative of the position of the first member relative to the second member based on changes in an electromagnetic property of the exposed portion of the member surface of the second member.

In some embodiments, the screening layer may include ferrite.

In some embodiments, the screening layer may have a magnetic permeability that is greater than 10. In some embodiments, the screening layer may have a magnetic permeability that is less than 10.

In some embodiments, the second member may be elongated along an axis that is parallel with a longitudinal direction. The second member may be linearly movable in the longitudinal direction relative to the inductive sensor element.

In some embodiments, the inductive sensor element may include a transmit winding and a receive winding.

In some embodiments, the exposed portion of the member surface may be spaced apart from the inductive sensor in a lateral direction that is perpendicular to the longitudinal direction by a spacing distance. The spacing distance may range from about 1 mm to about 30 mm, in some embodiments from about 2 mm to about 25 mm, in some embodiments from about 3 mm to about 15 mm, and in some embodiments from about 4 mm to about 10 mm.

In some embodiments, the second member may include at least one of a piston or an outer cylinder of a damper.

In some embodiments, the screening layer may include a layer of ferrite formed over a layer of conductive material. The ferrite layer of the screening layer may form a repeating pattern such that at least a portion of the layer of conductive material is exposed.

Another example aspect of the present disclosure is directed to a position sensor for a damper. The position sensor may be configured to detect relative position between a damper body and a piston received within the damper body. The piston may be slidable relative to the damper body in a longitudinal direction. The position sensor may include an inductive sensor element configured to be coupled to one of the damper body or the piston. The position sensor may include a screening layer formed over a screened portion of a member surface of the other of the damper body or the piston such that an exposed portion of the member surface is free of the screening layer. The position sensor may include processing circuitry configured to provide one or more signals indicative of the position of the damper body relative to the piston based on differences in respective electromagnetic properties of the exposed portion of the member surface of the second member and the screened portion of the member surface of the second member.

In some embodiments, the screening layer may be configured to reduce an effect on the induced signals in the inductive sensor element caused by the screened portion of the member surface.

In some embodiments, the screening layer may have a magnetic permeability that is greater than 10. In some embodiments, the screening layer may have a magnetic permeability that is less than 10.

In some embodiments, the inductive sensor element and the exposed portion of the member surface may be spaced apart in a lateral direction that is perpendicular to the longitudinal direction by a spacing distance. The spacing distance may range from about 1 mm to about 30 mm.

Another example aspect of the present disclosure is directed to method of sensing a relative position between a first member and a second member. The method may include providing an inductive sensor element that is configured to be coupled to the first member. The method may include detecting one or more signals indicative of the position of the first member relative to the second member based on differences in respective electromagnetic properties of an exposed portion of a member surface of the second member and a screened portion of the member surface of the second member. A screening layer may be formed over the screened portion of the member surface of the second member such that the exposed portion of the member surface is free of the screening layer.

In some embodiments, the screening layer may be configured to reduce an effect on the signals induced in the inductive sensor caused by the screened portion of the second member.

In some embodiments, the screening layer may have a magnetic permeability that is greater than 10. In some embodiments, the screening layer may have a magnetic permeability that is less than 10.

Another example aspect of the present disclosure is directed to an inductive position sensor configured to detect relative position between a first member and a second member. The inductive position sensor can include a transmit winding configured to be coupled to the first member, a receive winding configured to be coupled to the first member, and a screening layer formed over a screened portion of a member surface of the second member such that an exposed portion of the member surface is free of the screening layer. The inductive position sensor can include processing circuitry configured to provide one or more signals indicative of the position of the first member relative to the second member based on induced signals in the receive winding resulting from an oscillating signal provided to the transmit winding. Movement of the first member relative to the second member alters the signals induced in the receive winding based on interaction between the exposed portion of the member surface and an electromagnetic field generated by the transmit winding.

FIG. 1 depicts a schematic of select portions of an example position sensor 100 configured to detect relative position between a first member and a second member (not shown in FIG. 1), according to example embodiments of the present disclosure. The position sensor 100 can include an inductive sensor element 101 configured to be coupled to the first member (not shown in FIG. 1). In some embodiments, the inductive sensor element 101 can include a transmit aerial 102 and a receive aerial 104, which can include a cosine winding 103 and/or a sine winding 105.

In some embodiments, the position sensor 100 can include a coupling element 107. The coupling element 107 can include an exposed portion of a member surface of the second member. A screening layer can be formed over a screened portion of the member surface of the second member such that the exposed portion of the member surface is free of the screening layer. The second member can include a conductive material such that movement of the first member relative to the second member can alter signals induced in the receive aerial 104 based on interaction between the exposed portion of the member surface of the second member and an electromagnetic field generated by the transmit aerial 102.

The transmit aerial 102, the cosine winding 103, and the sine winding 105 can be electrically connected to respective terminals of processing circuitry 110. In this example, the processing circuitry 110 is in the form of a semiconductor integrated circuit device, such as an Application Specific Integrated Circuit (ASIC) or an Application Specific Standard Product (ASSP). In other examples, the processing circuitry 110 can use multiple interconnected devices and/or can be implemented using one or more suitable components (e.g., electronic components, such as discrete electronic components).

As shown in FIG. 1, the processing circuitry 110 can include a transmission (TX) drive stage 112, which can be configured to generate an oscillating electrical signal for supply to the transmit aerial 102. In this example, the TX drive stage 112 can be a free running oscillator that generates an oscillating electrical signal at a drive frequency determined by the inductance of the transmit aerial 102 and the capacitance of one or more capacitor(s) 113 connected in parallel to the transmit aerial 102. This drive frequency is normally selected to be in the range of about 100 kHz to about 6 MHz. The peak amplitude of the oscillating electrical signal can range from about 10 mA to 1,000 mA (e.g., about 50 mA). As used herein, the use of the term "about" in conjunction with a numerical value is intended to refer to within 20% of the stated numerical value.

Supplying an oscillating current to the transmit aerial 102 induces electromotive forces in the cosine winding 103 and the sine winding 105 of the receive aerial 104, which can induce signals (e.g., current, voltage, etc.) in the cosine winding 103 and the sine winding 105. As shown in FIG. 1, the cosine winding 103 and the sine winding 105 are separate windings such that separate signals can be induced in the cosine winding 103 and the sine winding 105. The cosine winding 103 and the sine winding 105 are electrically connected to separate terminals of the processing circuitry 110, with the signals in the cosine winding 103 being processed to provide a cosine output signal 123 and the signals in the sine winding 105 being processed to provide a sine output signal 125. The relative magnitudes and polarities of the cosine output signal 123 and the sine output signal 125 are indicative of the relative position (e.g., relative linear displacement) of the first member and the second member.

On entering the processing circuitry 110, signals in the cosine winding 103 may first go through an EMC filtering stage 115, which may reduce signal components at frequencies away from the drive frequency. Such signal components may be caused, for example, by interference from electrical signals generated by other nearby electrical components.

The filtered electrical signal may then go through a demodulation stage 117 in which the filtered electrical signal can be mixed with a demodulation signal from the TX drive stage 112. The demodulation signal can be in phase with the drive signal. In some embodiments, the electrical signal from the cosine winding 103 can be 180° out of phase with the drive signal.

In some embodiments, the demodulated electrical signal can pass through a low pass filtering stage 119 to remove high frequencies from the demodulated electrical signal. The demodulated electrical signal can then pass through gain and output buffer stage 121, which allows an adjustable gain to be applied before the cosine output signal 123 is output by the processing circuitry 110.

As will be apparent from FIG. 1, signals induced in the sine winding 105 can also undergo EMC filtering 115, synchronous demodulation 117, low pass filtering 119 and gain and output buffering 121 within the processing circuitry 110 before being output as the sine output signal 125.

In some embodiments, the transmit aerial 102, the cosine winding 103, and/or the sine winding 105 can be formed by conductive traces. The conductive traces can be formed on a printed circuit board or other substrate that is on coupled to the first member, for example to form a multilayer structure. In some embodiments, the sensor 100 can include the intermediate coupling element 107, which can include a conductive material (e.g., pattern of conductive material) located on the second member. In such embodiments, the screening layer can be formed over the intermediate coupling element 107.

However it should be understood that the processing circuitry can calculate a signals number to represent position based on signals received from the cosine winding 103 and/or sine winding 105 without processing a separate "cosine output signal" and/or "sine signal," as described above.

Figure 2:
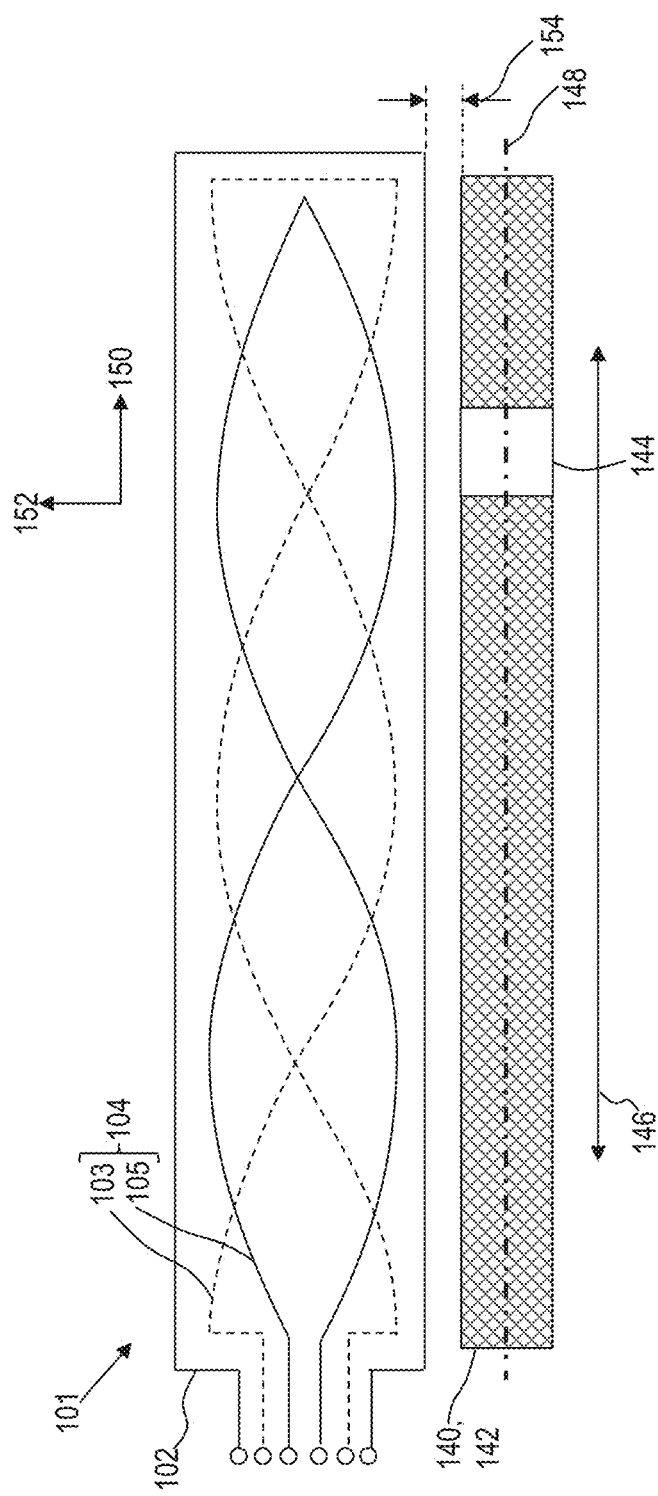
FIG. 2 depicts a schematic of the example inductive position sensor of FIG. 1 including an example configuration of a transmit aerial, a receive aerial and a member having a ferrite coating according to example embodiments of the present disclosure.

FIG. 2 depicts one example configuration of a transmit aerial 102, cosine winding 103 and sine winding 105 of the inductive sensor element 101 of FIG. 1 according to example embodiments of the present disclosure. The transmit aerial 102, cosine winding 103 and sine winding 105 can be coupled to a substrate, such as a printed circuit board. The transmit aerial 102, cosine winding 103, and sine winding 105 can be configured as a multilayer structure with different components or portions of the transmit aerial 102, cosine winding 103, and sine winding 105 being arranged in different layers of a printed circuit board or other substrate.

A second member 140 can include a screening layer 142 formed over a screened portion (indicated by cross-hatching in FIG. 2) of a member surface of the second member 140 such that an exposed portion 144 of the member surface is free of the screening layer 142. Movement of the first member relative to the second member 140 (e.g., as illustrated by arrow 146 in FIG. 2) can be detected based on differences in respective electromagnetic properties (e.g., induced Eddy currents, magnetic permeability, etc.) of the exposed portion 144 of the member surface of the second member 140 and the screened portion of the member surface of the second member 140. For example, the inductive sensor element 101 can detect eddy currents in the exposed portion 144 and/or screen portion of the member surface of the second member 140. For example, such movement can alter a current induced in the receive winding (e.g., the cosine winding 103, sine winding 105, or both) based on interaction between the exposed portion 144 of the member surface and an electromagnetic field generated by the transmit aerial 102, for example as described below with reference to FIGS. 4 and 5.

The screening layer 142 can be configured to reduce an effect on the inductive sensor 101 caused by the screened portion of the second member 140. For example, one or more properties of the screening layer 142 (e.g., magnetic permeability, conductivity, thickness, spacing between ferrite layer and metal, pattern in the ferrite layer etc.) and/or properties of the underlying conductive metal can be selected to reduce (e.g., minimize) the effect on the signals induced in the inductive sensor 101 by the screened portion of the second member 140. For instance, in some embodiments, the screening layer 140 can have a magnetic permeability that is greater than 10. In other embodiments, however, the screening layer 142 can have a magnetic permeability that is less than 10. Thus, the screening layer 142 can "screen" the screened portion such that relative location of the exposed portion 144 of the second member 140 can more easily or accurately be detected by the receive aerial 104.

Generally, the screened portion of the second member 140 may be larger than the exposed portion 144 of the second member 140 in the vicinity of the inductive sensor element 101. For example, the screened portion of second member 140 may be adequately large relative to the exposed portion 144 in the vicinity of the inductive sensor 101 such that the exposed portion 144 can act as a "spot" target for the inductive sensor element 101.

The inductive sensor element 101 and the exposed portion 144 of the member surface of the second member 140 can be spaced apart in a lateral direction 152 that is perpendicular to the longitudinal direction 150 by a spacing distance 154. In some embodiments, the spacing distance may ranges from about 1 mm to about 30 mm. The spacing distance can be selected to reduce (e.g., minimize) the effect on the signals induced in the inductive sensor element 101 by the screened portion of the second member 140 (e.g., current induced in the receive aerial 104). In other words, the spacing distance can be selected to improve the "screening" effect of the screening layer 142.

The second member 140 can be elongated along an axis 148 that is parallel with a longitudinal direction 150. The second member 140 can be movable (e.g., linearly movable) in the longitudinal direction 150 (illustrated by arrow 146 in FIG. 2) relative to the inductive sensor element 101 along the axis 148 of the second member.

Figure 3A:
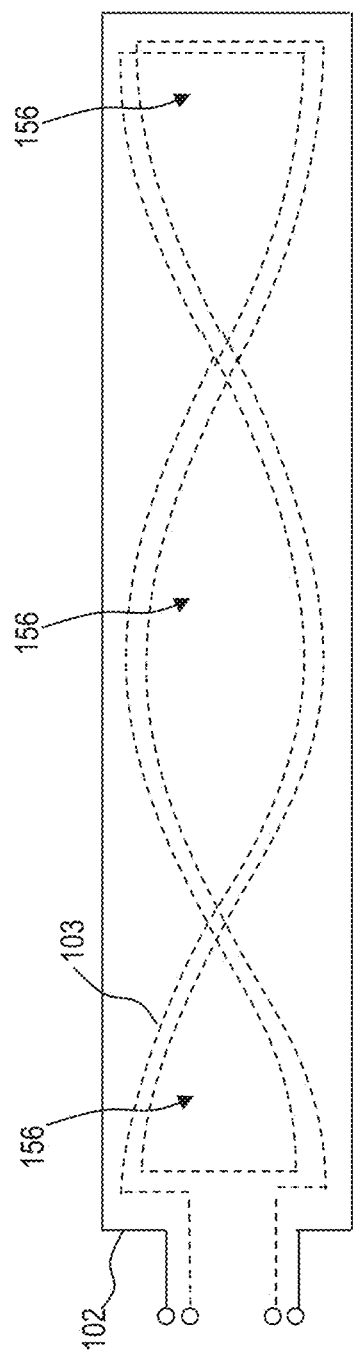
FIG. 3A depicts one embodiment of a cosine winding of an example inductive position sensor according to example embodiments of the present disclosure.
Figure 3B:
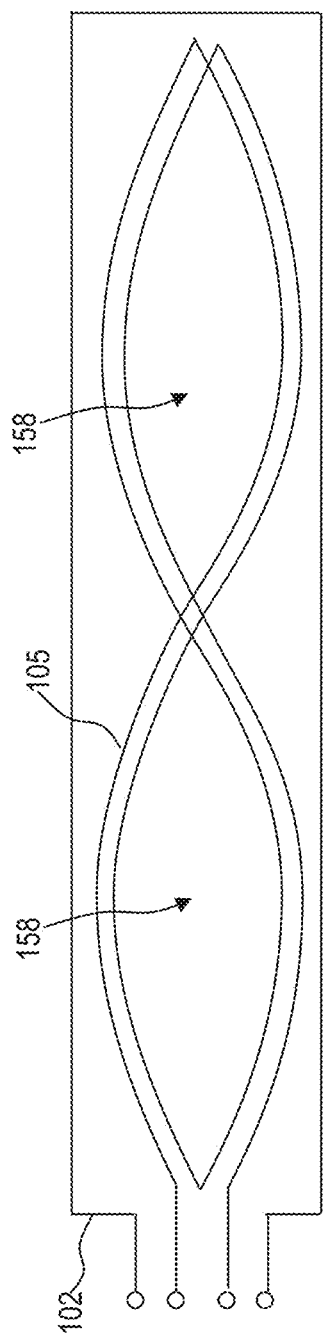
FIG. 3B depicts one embodiment of a sine winding of an example inductive position sensor according to example embodiments of the present disclosure.

Referring to FIGS. 3A and 3B, in some embodiments, the cosine winding 103 and/or sine winding 105 can form multiple turns and/or loops. For example, FIG. 3A illustrates one embodiment of the cosine winding 103 in which the cosine winding 103 forms two turns. In other words, the sinusoidal pattern repeats as the cosine winding 103 is doubled across the length of the cosine winding 103, as shown in FIG. 2.

Additionally, referring to FIG. 3A, in this example, the cosine winding 103 forms three loops 156. FIG. 3B illustrates one embodiment of the sine winding 105 in which two turns are formed. Additional, in this example, the sine winding 105 forms two loops 158. However it should be understood that the cosine winding 103 and sine winding 105 may form any suitable number of turns and/or loops. For example, a number of loops of the cosine winding 103 and/or sine winding 105 may range from 1 to about 10 or more, in some embodiments from about 2 to about 6. A number of loops of the cosine winding 103 and/or sine winding 105 may range from about 1 to about 10 or more, in some embodiments from about 2 to about 6.

Figure 4:
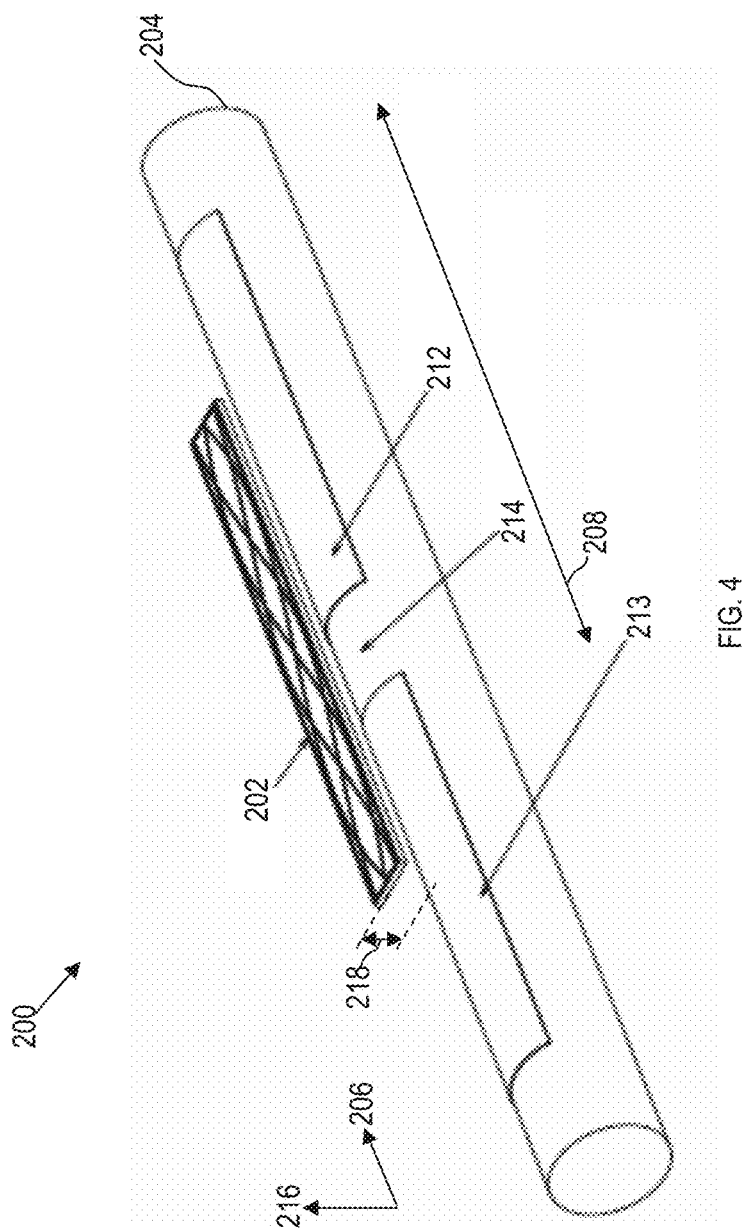
FIG. 4 illustrates one embodiment of a position sensor assembly according to aspects of the present disclosure.

FIG. 4 illustrates one embodiment of a position sensor assembly 200 aspects of the present disclosure. The position sensor 200 can be configured to detect relative movement in a longitudinal direction 206 between a sensor element 202 and a member 204 (represented by arrow 208). The sensor element 202 can be coupled to an additional member (not shown in FIG. 4).

The sensor element 202 can include one or more windings (e.g., transmit and sensor windings), for example as described above with reference to FIGS. 2 through 3B. The sensor element 202 can include a printed circuit board on which the windings are formed as conductive traces, for example as described with reference to FIGS. 2 through 3. However, it should be understood that any suitable type of inductive sensor element 202 may be used within the scope of this disclosure. For example, the coil arrangement on a sensor element 202 may be as minimal as a single coil, or for example have two coils, featuring "bow tie" shape or triangular shapes. A greater number of coils may also be employed (e.g., three or more), within various transmit and receive configurations. For example, multiple sine shaped coils may be translated (e.g., about 90 or about 120 degrees) relative to each other. The processing circuitry may be configured to detect mutual or self-inductance properties of the coils.

One or more screening layers 212, 213 can be formed over screened portion(s) of a member surface of the member 204. An exposed portion 214 of the member surface of the member 204 can be free of the screening layer. For example the screening layers 212, 213 may be spaced apart in the longitudinal direction 206. The exposed portion 214 may be disposed between the screening layers 212, 213 in the longitudinal direction. Additionally, one or both of the screening layers 212, 213 may extend beyond the sensor element 202 in the longitudinal direction 208. The screening layers 212, 213 may be sized such that, over a range of movement of the member 204 relative to the sensor element 202, only the exposed portion 214 that is between the screening layers 212, 213 intersects with the sensor element 202 in the longitudinal direction 206. Movement (illustrated by arrow 208) of the member 204 relative to sensor element 202 can be detected by the sensor element 202 by detecting changes in an electromagnetic property of the exposed portion 214 of the member surface of the member 204.

The sensor element 202 (e.g., including the receive winding and/or transmit winding) can be can be spaced apart from the exposed portion 214 of the member surface of the member 204 in a lateral direction 216 that is perpendicular to the longitudinal direction 206 by a spacing distance 218. In some embodiments, the spacing distance 218 may range from about 1 mm to about 30 mm.

As indicated above, the screened portion(s) of the member 204 may generally be larger than the exposed portion 214 of the member 204 in the vicinity of the sensor element 202. For example, within a projection of a perimeter of the sensor element 202 in the lateral direction 216 onto the member 204, 50% or more of the member 204 may covered by the screening layers 212, 213, in some embodiments 70% or more, in some embodiments 80% or more, in some embodiments 90% or more, and in some embodiments 95% or more.

Additionally, in some embodiments a conductive layer of material may be applied between the screening layer(s) 212, 213 and the member 204. The conductive layer of material may also extend over some or all of the exposed portion 214 of the member 204. This may facilitate greater control of the precise properties (e.g., thickness, conductivity, etc.) of the conductive material beneath the screening layer(s) 212, 213 and/or covering the exposed portion 214 of the member.

In yet further embodiments, a target ferrite layer can be formed over some or all of the exposed portion 214, for example to act as a target for the sensor element 202. Unlike the screening layer(s) 212, 213, which can be configured to mask the presence of a conductive material (e.g., the member 204 or a conductive layer formed on the member 204) as described herein, the target ferrite layer can be configured to interact with sensor element 202 such that the sensor element 202 can detect the relative position of the target ferrite layer with respect to the sensor element 202. Thus, the "exposed portion" 214 of the member 204 may refer to any portion of the member 204 that is not covered by the screening layer(s) 212, 213.

Figure 5:
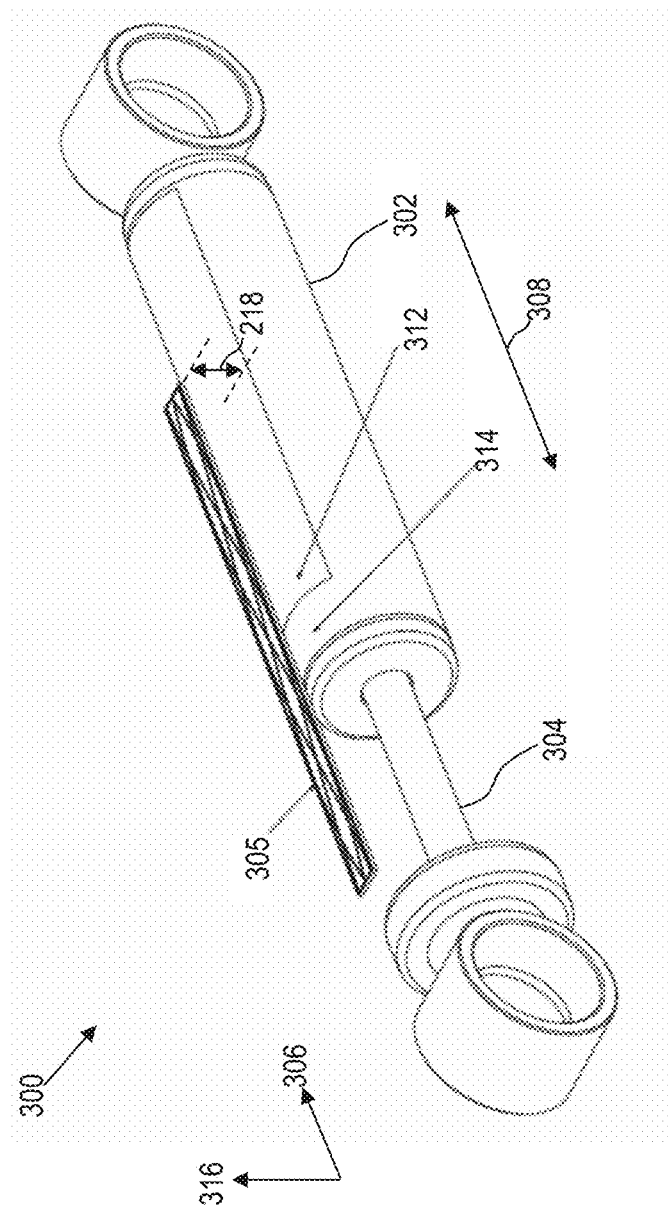
FIG. 5 depicts one embodiment of a position sensor assembly for detecting relative position between a damper body and a piston of a damper according to aspects of the present disclosure.

FIG. 5 illustrates an embodiment of a position sensor assembly 300 for a damper according to aspects of the present disclosure. The position sensor assembly 300 can be configured to detect relative position between a damper body 302 and a piston 304 received within the damper body 302. The damper body 302 can be slidable relative to the piston 304 (represented by arrow 308) in a longitudinal direction 306.

A sensor element 305 can include windings 310 (e.g., transmit and receive windings), for example as described above with reference to FIGS. 2 through 3B. The sensor element 305 can include a printed circuit board on which the windings are formed as conductive traces. However, it should be understood that any suitable type of inductive sensor element 305 may be used within the scope of this disclosure. The sensor element 305 can be affixed or coupled to the piston 304 or a component that is affixed or coupled to the piston 304 such that relative movement between the piston 304 and the windings 310 is minimized or eliminated.

Processing circuitry, for example as described above with reference to FIG. 1, can be employed to process signals received from the sensor element 305 to detect a position of the damper body 302 relative to the piston 304. However, it should be understood that any suitable processing circuitry can be used within the scope of this disclosure.

The position sensor assembly 300 can include a screening layer 312 formed over a screened portion of a member surface of the damper body 302. An exposed portion 314 of the member surface of the damper body 302 can be free of the screening layer 312. Movement (illustrated by arrow 308) of the damper body 302 relative to the piston 304 (and windings 310) in a longitudinal direction 306 can be detected based on changes in an electromagnetic property of the exposed portion 314 of the surface of the damper body 302.

The sensor assembly 305 can be can be spaced apart from the exposed portion 314 of the member surface of the damper body 302 in a lateral direction 316 that is perpendicular to the longitudinal direction 306 by a spacing distance 318. In some embodiments, the spacing distance 218 may range from about 1 mm to about 30 mm.

As noted above, in some embodiments a conductive layer of material may be applied between the screening layer(s) 312 and the damper body 302. The conductive layer of material may also extend over some or all of the exposed portion 314 of the damper body 302. This may facilitate greater control of the precise properties (e.g., thickness, conductivity, etc.) of the conductive material beneath the screening layer 312 and/or covering the exposed portion 314 of the damper body 302.

In yet further embodiments, a target ferrite layer can be formed over some or all of the exposed portion 314, for example to act as a target for the sensor assembly 305. Unlike the screening layer 312, which can be configured to mask the presence of a conductive material (e.g., the damper body 302 or a conductive layer formed on the damper body 302) that is beneath the screening layer 312 as described herein, the target ferrite layer can be configured to interact with sensor assembly 305 such that the sensor assembly 305 can detect the relative location of the target ferrite layer with respect to the sensor assembly 305. Thus, the "exposed portion" 314 of the damper body 302 can refer to any portion of the damper body 302 that is not covered by the screening layer 312.

Figure 6:
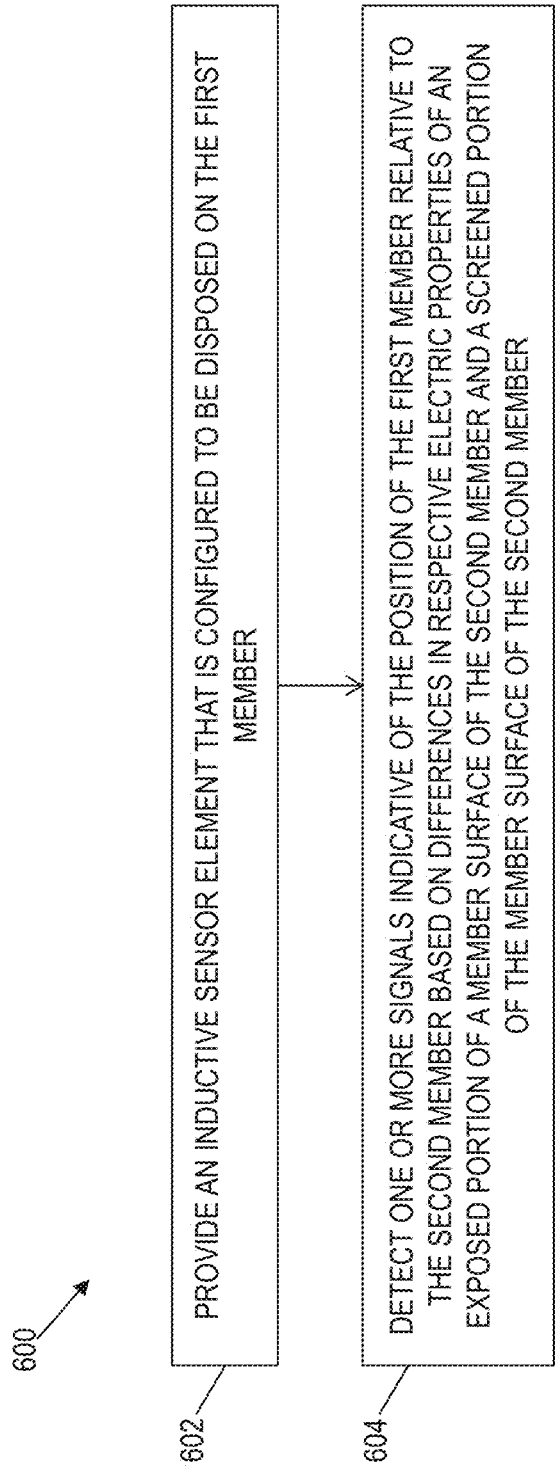
FIG. 6 depicts a flow diagram of an embodiment of a method of sensing a relative position between a first member and a second member according to aspects of the present disclosure.

FIG. 6 illustrates a flow diagram of an embodiment of a method 600 of sensing a relative position between a first member and a second member according to aspects of the present disclosure. Although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure. Moreover, the method 600 may be described herein with reference to the position sensors 100, 200, 300 described above with reference to FIGS. 1 through 6. However, it should be appreciated that the disclosed method 600 may be used for sensing a relative position between a first member and a second member using an inductive position sensor having any other suitable configuration.

The method 600 may include, at (602), providing an inductive sensor element that is configured to be coupled to the first member. For example, the inductive sensor may include a transmit and/or a receive winding, which may be formed as multilayer structure. For example, the transmit and/or receive windings may be formed as conductive traces on one or more printed circuit boards. The transmit and/or receive windings may be generally configured as described above with reference to FIGS. 2 through 3B.

The method 600 may include, at (604), detecting one or more signals indicative of the position of the first member relative to the second member based on differences in respective electromagnetic properties of an exposed portion of a member surface of the second member and a screened portion of the member surface of the second member, for example as described above with reference to FIGS. 1 through 5. The screening layer may be formed over a screened portion of the member surface of the second member such that the exposed portion of the member surface is free of the screening layer.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An inductive position sensor configured to detect relative position between a first member and a second member, the inductive position sensor comprising:
    an inductive sensor element configured to be coupled to the first member; and
    a screening layer formed over a screened portion of a member surface of the second member such that an exposed portion of the member surface is free of the screening layer, wherein the exposed portion acts as a spot target for the inductive sensor element, wherein the screening layer is configured to reduce an effect on induced signals in the inductive sensor element caused by the screened portion of the second member, and wherein the screening layer is configured to mask the presence of conductive material on the second member covered by the screening layer;
    wherein the screened portion is larger than the exposed portion on the second member.

2. The inductive position sensor of claim 1, further comprising processing circuitry configured to provide one or more signals indicative of the position of the first member relative to the second member based on differences in respective electromagnetic properties of the exposed portion of the member surface of the second member and the screened portion of the member surface of the second member.

3. The inductive position sensor of claim 1, wherein the screening layer comprises ferrite.

4. The inductive position sensor of claim 1, wherein the second member is elongated along an axis that is parallel with a longitudinal direction, and the second member is linearly movable in the longitudinal direction relative to the inductive sensor element.

5. The inductive position sensor of claim 1, wherein the inductive sensor element comprises at least a transmit winding and a receive winding.

6. The inductive position sensor of claim 1, wherein the exposed portion of the member surface is spaced apart from the inductive sensor in a lateral direction that is perpendicular to the longitudinal direction by a spacing distance.

7. The inductive position sensor of claim 6, wherein the spacing distance ranges from about 1 mm to about 30 mm.

8. The inductive position sensor of claim 1, wherein the second member comprises at least one of a piston or an outer cylinder of a damper.

9. A position sensor for a damper, the position sensor configured to detect relative position between a damper body and a piston received within the damper body, the piston slidable relative to the damper body in a longitudinal direction, the position sensor comprising:
    an inductive sensor element configured to be coupled to one of the damper body or the piston;
    a screening layer formed over a screened portion of a member surface of the other of the damper body or the piston such that an exposed portion of the member surface is free of the screening layer, wherein the exposed portion acts as a spot target for the inductive sensor element, wherein the screened portion is larger than the exposed portion; and
    processing circuitry configured to provide one or more signals indicative of the position of the damper body relative to the piston based on differences in respective electromagnetic properties of the exposed portion of the member surface and the screened portion of the member surface.

10. The position sensor of claim 9, wherein the screening layer is configured to reduce an effect on signals induced in the inductive sensor element caused by the screened portion of the member surface.

11. The position sensor of claim 9, wherein the inductive sensor element and the exposed portion of the member surface are spaced apart in a lateral direction that is perpendicular to the longitudinal direction by a spacing distance.

12. A method of sensing a relative position between a first member and a second member, the method comprising:
    providing an inductive sensor element that is configured to be coupled to the first member; and
    detecting one or more signals indicative of the position of the first member relative to the second member based on differences in respective electromagnetic properties of an exposed portion of a member surface of the second member and a screened portion of the member surface of the second member, wherein a screening layer is formed over the screened portion of the member surface of the second member such that the exposed portion of the member surface is free of the screening layer, wherein the exposed portion acts as a spot target for the inductive sensor element, and wherein the screening layer is configured to mask the presence of conductive material on the second member covered by the screening layer;
    wherein the screened portion is larger than the exposed portion on the second member.

13. The method of claim 12, wherein the screening layer is configured to reduce an effect on induced signals in the inductive sensor element caused by the screened portion of the second member.

14. An inductive position sensor configured to detect relative position between a first member and a second member, the inductive position sensor comprising:
    an inductive sensor element comprising:
        a transmit winding configured to be coupled to the first member; and
        a receive winding configured to be coupled to the first member;
    a screening layer formed over a screened portion of a member surface of the second member such that an exposed portion of the member surface is free of the screening layer, wherein the exposed portion acts as a spot target for the inductive sensor element, and wherein the screening layer is configured to mask the presence of conductive material on the second member covered by the screening layer; and
    processing circuitry configured to provide one or more signals indicative of the position of the first member relative to the second member based on signals induced in the receive winding resulting from an oscillating signal provided to the transmit winding;
    wherein movement of the first member relative to the second member alters the induced signals in the receive winding based on interaction between the exposed portion of the member surface and an electromagnetic field generated by the transmit winding;
    wherein the screened portion is larger than the exposed portion on the second member.

* * * * *